United States Patent [11] 3,623,148

[72] Inventor Philip E. Berghausen
 Cincinnati, Ohio
[21] Appl. No. 54,102
[22] Filed July 13, 1970
[45] Patented Nov. 23, 1971
[73] Assignee Cincinnati Milacron Inc.
 Cincinnati, Ohio

[54] APPARATUS FOR SENSING THE FREQUENCY OF MACHINING PULSES FROM AN EDM POWER SUPPLY
 2 Claims, 2 Drawing Figs.
[52] U.S. Cl. .................................................. 331/172,
 219/69 C, 219/69 P, 219/69 S
[51] Int. Cl. .................................................. B23k 9/10
[50] Field of Search .......................................... 307/290;
 331/172, 173, 174, 113.1, 178; 219/69 S, 69 C, 69 P

[56] References Cited
 UNITED STATES PATENTS
 3,229,158 1/1966 Jensen .......................... 331/113.1
 3,381,141 4/1968 Millon .......................... 307/290
 3,217,270 11/1965 Friedrichs et al. ............ 331/172

*Primary Examiner*—John Kominski
*Attorneys*—Howard T. Keiser and Jack J. Earl

ABSTRACT: An apparatus for monitoring the frequency of output pulses from an EDM power supply and terminating the operation of the supply when the output pulse frequency exceeds a predetermined magnitude. The apparatus comprises a frequency sensing circuit that produces an output signal having a magnitude that is a function of the output pulse frequency. A switching network is connected to the sensing circuit and terminates the operation of the power supply in response to an output signal representing the predetermined output pulse frequency magnitude.

PATENTED NOV 23 1971    3,623,148

INVENTOR.
Philip E. Berghausen.
BY
Howard H. Keiser
Jack J. Earl

APPARATUS FOR SENSING THE FREQUENCY OF MACHINING PULSES FROM AN EDM POWER SUPPLY

BACKGROUND OF THE INVENTION

The invention relates generally to an improvement to an electrodischarge machining (EDM) power supply. Specifically, the invention concerns a protection circuit for sensing the frequency of the output pulses from the power supply and extinguishing said output pulses when they exceed a predetermined frequency.

In general, EDM power supplies may be divided into three major components: an oscillator, a direct current source, and power switching circuits. The oscillator, which is a low power source of pulses, is used to drive the power switching circuits which produce output machining pulses by switching the output of the direct current supply. Many traditional power supplies contain an oscillator frequency adjustment that varies the period of the output pulses. In these supplies, the maximum frequency can be readily controlled by limiting the range of the frequency adjustment. More recent power supplies do not have an oscillator frequency adjustment but have ON time and OFF time controls. The ON time represents the time duration of an output pulse, and the OFF time represents the time duration between output pulses. With such independent controls, it is possible to obtain very short ON and OFF times and hence very high frequencies. These very high frequencies may be damaging to the power supply switching transistors in the power supply output circuit.

Therefore, applicant proposes a circuit responsive to the oscillator output which produces an output signal that changes as a function of the output pulse frequency of the oscillator. When the frequency is increased to a predetermined level, the output triggers a switching device which is operable to terminate the operation of the power supply. Restoration of the power supply operation requires the attention of an operator who must decrease the supply output frequency by increasing the OFF or ON times.

SUMMARY OF THE INVENTION

In an EDM power supply of the type containing independently variable ON time and OFF time controls and generating machining pulses for producing electrical discharges across a machining gap, a circuit is provided for producing an output that varies as a function of the frequency of the machining pulses. A switch is connected to the circuit and is responsive to a predetermined circuit output. The circuit output represents a frequency magnitude that if exceeded will be damaging to the power supply. The switch operates to disable the power supply thereby terminating the production to machining pulses.

DESCRIPTION OF THE PREFERRED EMBODIMENT

Figure 1:
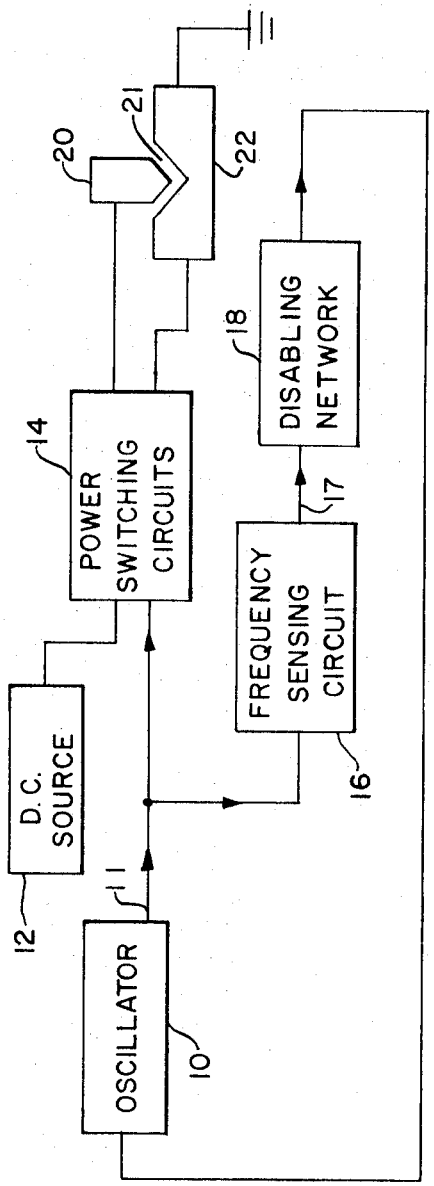
FIG. 1 is a block diagram of an EDM power supply illustrating the preferred embodiment of the invention.

FIG. 1 is a block diagram illustrating how the frequency measuring circuit operates in combination with a typical EDM power supply. The power supply contains an oscillator 10, which may be a multivibrator or other source of pulses, a direct current source 12, and power switching circuits 14. The power switching circuits 14 are controlled by pulses from the oscillator 10 and switch the output of the source 12 to supply machining pulses to a gap 21 formed between an electrically conductive tool 20 and an electrically conductive workpiece 22. Connected to the output of the oscillator 10 is a frequency sensing circuit 16. The output 17 of the circuit 16 is a signal that changes as a function of the frequency of the output 11 of the oscillator 10. As the oscillator frequency increases, the output 17 also increases. A disabling network 18 is coupled to the output 17 of the circuit 16 and is a threshold sensitive device. In other words, its input must reach a predetermined voltage level before the network 18 is operative. When this voltage level is reached, the network 18 changes state and operates to terminate the output 11 of the oscillator 10.

It should be noted at this point that the exact point chosen to disable the power supply and thereby the power switching circuits is purely an arbitrary one. Since the oscillator is the source of the undesirable condition, i.e. the high frequency, and the device most readily interfaced because of its low power operation, this embodiment illustrates the oscillator 10 as being disabled.

Figure 2:
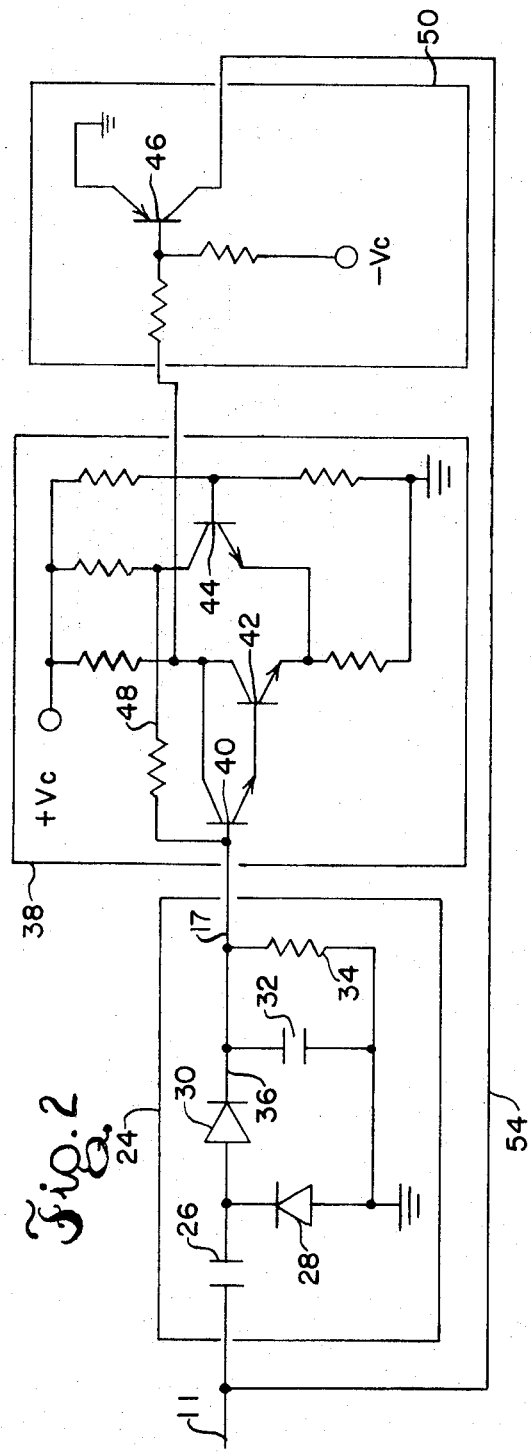
FIG. 2 is a detailed schematic diagram of the preferred embodiment of the invention.

FIG. 2 is a detailed schematic diagram of the invention and related elements. The block 24 is a detailed schematic diagram of the preferred embodiment of the frequency sensing circuit and has an input connected to the output 11 of the oscillator 10. Assume for purposes of this disclosure, the output pulses from the oscillator are negative pulses. During the ON times, the pulse magnitude is at a negative voltage level and during the OFF times the pulse magnitude is at ground potential. During an ON time the capacitor 26 charges to the input potential through diode 28. During the next OFF time, the capacitor 26 discharges through diode 30 and into capacitor 32. While the capacitor 26 is recharging during the succeeding ON time, the capacitor 32 is leaking its charge through a resistor 34. During the next OFF time, capacitor 32 is charged again to a higher value. If the time constant as defined by capacitor 32 and resistor 34 is large compared to the time of a cycle of the input 11, the output 17 will attain a relatively stable average value. Further, as the frequency of the input 11 increases, the magnitude of the output 17 will increase as a function thereof. This is readily apparent by looking at the parameters that define the magnitude of the voltage of the output 17.

It should be noted that this analysis does not apply to the initial application of the input 11, but it is applicable after the circuit parameters have attained their average values. The voltage of the output 17 is a function of the difference between the voltage magnitudes of the input 11 and the output 17, the frequency of the input 11, and the magnitudes of the resistor 34 and the capacitor 26.

Further, if the product of the magnitudes of the resistor 34, the capacitor 26, and the frequency of the input 11 is very much less than one, then the voltage of the output 17 is a function of the voltage and frequency of the input 11 and the magnitudes of the capacitor 26 and the resistor 34.

The resistor and capacitor sizes and the input voltage magnitude are constant, therefore the magnitude of the output 17 will vary with the frequency of the input 11.

The preferred embodiment of the switching current 38 is illustrated as a Schmidt trigger comprised of transistors 40, 42 and 44. The transistors 40 and 42 are connected in the well-known Darlington configuration. This provides a greater gain for a more reliable switching operation. In the quiescent state, transistors 40 and 42 are nonconducting; and transistor 44 is conducting. As mentioned earlier, a predetermined input frequency will result in a voltage magnitude on output 17 to switch transistors 40 and 42 into conduction. This causes transistor 44 to rapidly terminate conduction. When transistor 44 stops conducting, its collector goes to a more positive level. This positive level is fed back via conductor 48 to the input of the Darlington configuration or the base of transistor 40 and locks the Schmidt trigger input or transistors 40 and 42 in a conductive state.

As mentioned earlier, there are many possible ways to disable the power supply. The oscillator may be disabled internally at several points, or driver stages of the power switching circuits may be disabled. For reasons of simplicity and ease of explanation, a disabling switching network 50 will be used to shunt to ground the oscillator output 11. When transistors 40 and 42 start conducting, the base of transistor 46 is driven to a negative level causing conduction through transistor 46 and shunting the oscillator output 11 to ground through the conductor 54. To summarize, when the oscillator frequency exceeds the predetermined magnitude, this frequency is detected by the measuring circuit 24 which produces an output activating the switch 38 and the network 50 thereby shunting the high-frequency pulses on the oscillator output 11 to ground. The power supply is disabled without damage to the power switching circuits. In this case, the power must be turned off in order to release the feedback latch 48 in the Schmidt trigger. During this time, the ON and OFF times must be adjusted to produce a lower frequency. Power is then restored to the power supply, and the device will operate in a normal manner.

While the invention has been illustrated in some detail according to the preferred embodiment shown in the accompanying drawings, and while the preferred illustrated embodiment has been described in some detail, there is no intention to thus limit the invention to such details. On the contrary, it is intended to cover all modifications, alterations and equivalents falling within the spirit and scope of the appended claims.

What is claimed is:

1. In an EDM power supply of the type comprising an oscillator producing pulses having a constant voltage magnitude and a variable frequency, and power switching circuits responsive and sensitive to the frequency of said oscillator pulses for switching an output of a DC source to produce machining pulses from the power supply, an improvement comprising the steps of:

a. sensing the frequency of the oscillator output signal by a frequency sensitive circuit and producing an output signal having a magnitude that is a function of the frequency of the oscillator pulses; and
   b. inhibiting by a disabling network the production of pulses from the oscillator in response to a predetermined magnitude of the output signal representing a pulse frequency that may be damaging to the power switching circuits.

2. In an EDM power supply of the type comprising an oscillator producing pulses having a constant voltage magnitude and a variable frequency, and power switching circuits responsive and sensitive to the frequency of said oscillator pulses for switching an output of a DC source to produce machining pulses from the power supply, an improvement comprising:

a. sensing the frequency of the oscillator output signal by a frequency sensitive circuit and producing an output signal having a magnitude that is a function of the frequency of the oscillator pulses;
   b. producing by a switching circuit, a second output signal in response to a predetermined magnitude of the first output signal from the sensing circuit representing a pulse frequency that may be damaging to the power switching circuits; and
   c. terminating by a disabling network the input of pulses produced by the oscillator to the power switching circuits in response to the second output signal.

* * * * *